US012798926B2

(12) United States Patent
Lendi et al.

(10) Patent No.: US 12,798,926 B2
(45) Date of Patent: Nov. 17, 2026

(54) SENSOR DEVICE FOR DOOR CONTROL

(71) Applicant: CEDES AG, Landquart (CH)

(72) Inventors: Martin Lendi, Kaltbrunn (CH); Manfred Norbert Stein, Domat/Ems (CH)

(73) Assignee: CEDES AG, Landquart (CH)

( * ) Notice: Subject to any disclaimer, the term of this patent is extended or adjusted under 35 U.S.C. 154(b) by 892 days.

(21) Appl. No.: 18/295,950

(22) Filed: Apr. 5, 2023

(65) Prior Publication Data

US 2023/0322524 A1 Oct. 12, 2023

(30) Foreign Application Priority Data

Apr. 7, 2022 (EP) .................................... 22167239

(51) Int. Cl.
*B66B 13/04* (2006.01)
*B66B 13/14* (2006.01)
*B66B 13/26* (2006.01)

(52) U.S. Cl.
CPC ............ *B66B 13/146* (2013.01); *B66B 13/26* (2013.01)

(58) Field of Classification Search
CPC ....... B66B 13/14; B66B 5/0012; B66B 13/26; B66B 13/146; B66B 5/0006
USPC .......................................................... 187/316
See application file for complete search history.

(56) References Cited

U.S. PATENT DOCUMENTS 5,001,557 A * 3/1991 Begle ...................... B66B 13/26 250/221
11,274,020 B2 * 3/2022 Seki ...................... B66B 13/146

FOREIGN PATENT DOCUMENTS

CN 101759083 A 6/2010

OTHER PUBLICATIONS

Nakajima et al. (JP 2014001028 A) Sill Groove Foreign Matter Detection Device for Elevator (Year: 2014).*

鹿井 正博 (JP 5554236) Sliding Door Device and Elevator (Year: 2014).*

Search Report for European Patent Application No. 22167239.7 dated Sep. 29, 2022, 7 pages.

* cited by examiner

*Primary Examiner* — Jorge L Carrasquillo
(74) *Attorney, Agent, or Firm* — Christopher J. Volkmann; KELLY, HOLT & CHRISTENSON PLLC

(57) ABSTRACT

Sensor device for an elevator comprising a car comprising an elevator door, which has a door movement space in the passage and disposed in front of which is a spatial region in front on the floor in front of the door movement space, comprising a detection device, configured for separately detecting objects in the door movement space and in the spatial region in front and for carrying out successive detection passes, and comprising an evaluation device, wherein the evaluation device has a memory and is configured to store in the memory at least temporarily the information as to whether an object has been detected during a detection pass, and to output an early closing signal for closing the elevator doors if no object has been detected during a detection pass and the information that an object has been detected has been stored in the memory for a preceding detection pass, in particular for a specific preceding detection pass, in particular for the directly preceding detection pass.

18 Claims, 1 Drawing Sheet

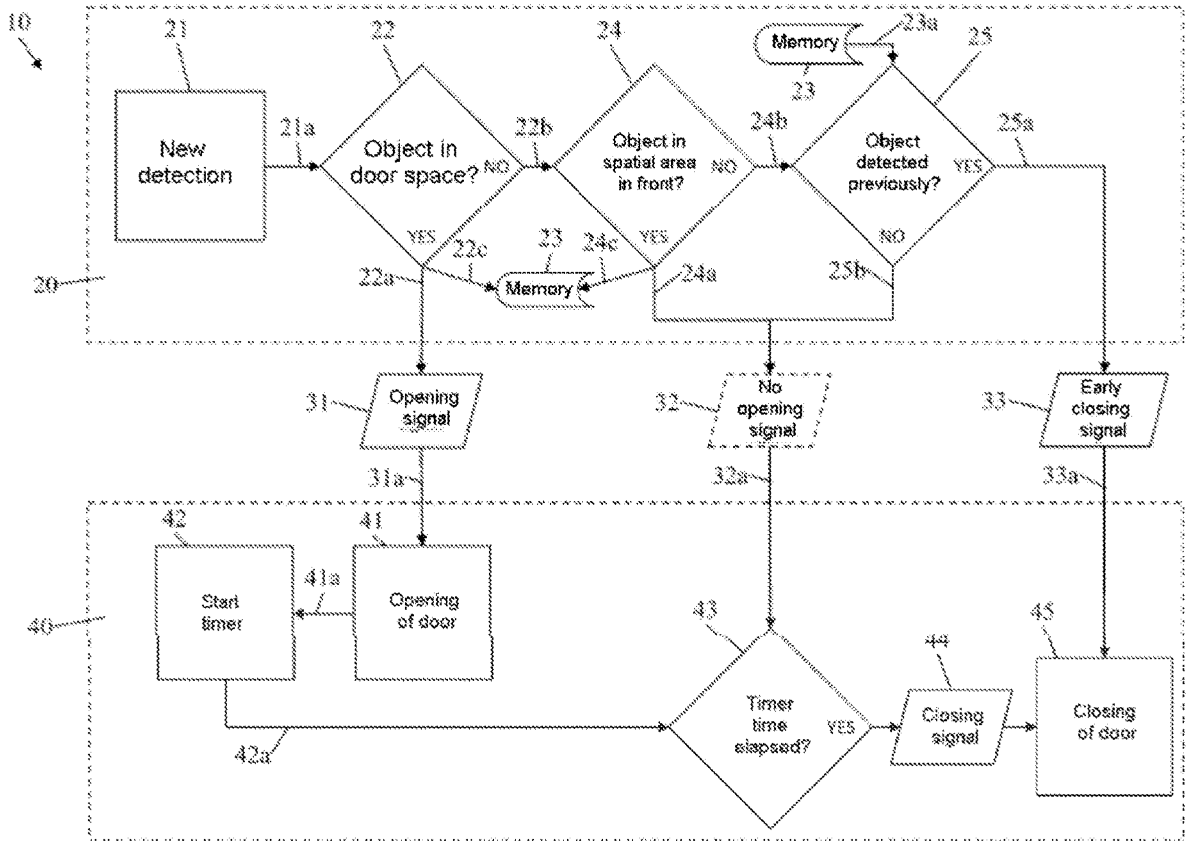
10
21
22
24
Memory
23a
25
23
New detection
21a
Object in door space?
NO
22b
Object in spatial area in front?
NO
24b
Object detected previously?
YES
25a
YES
22c
23
24c
YES
NO
20
22a
Memory
24a
25b
31
Opening signal
32
No opening signal
33
Early closing signal
31a
32a
33a
42
41
Start timer
41a
Opening of door
40
43
44
45
Timer time elapsed?
YES
Closing signal
Closing of door
42a

SENSOR DEVICE FOR DOOR CONTROL

CROSS-REFERENCES TO RELATED APPLICATION

This application claims the benefit of European Application No. 22167239.7, filed Apr. 7, 2022.

BRIEF DESCRIPTION OF THE DRAWINGS

Exemplary embodiments of the present disclosure are illustrated in the drawings and are explained in greater detail below. In this case, identical reference signs in the individual FIGURES designate elements that correspond to one another.

FIG. 1 shows a control system with sensor device according to one example.

DETAILED DESCRIPTION

The present disclosure relates to a sensor device for controlling the elevator door of an elevator depending on the detection of the passage to the elevator car and a spatial area in front of the elevator car.

Sensor devices of the aforementioned type are known from the prior art.

It is an object of the present disclosure to provide a sensor device having more convenient use properties.

Proceeding from a sensor device of the type mentioned in the introduction, this object is achieved by means of a sensor device according to claim 1 and a control system according to claim 7. Advantageous embodiments are specified in the further dependent claims.

The sensor device according to the present disclosure is a sensor device for an elevator comprising a car comprising an elevator door, which has a door movement space in the passage and disposed in front of which is a spatial region in front on the floor in front of the door movement space. The sensor device has a detection device configured for separately detecting objects in the door movement space and in the spatial region in front and for carrying out successive detection passes. The sensor device has an evaluation device having a memory. The sensor device is configured to store in the memory at least temporarily the information as to whether an object has been detected during a detection pass. It is unimportant here whether the object was detected in the door movement space or in the spatial region in front. The sensor device is configured to output an early closing signal for closing the elevator doors if no object has been detected during a detection pass and the information that an object has been detected has been stored in the memory for a preceding detection pass, in particular for a specific preceding detection pass, in particular for the directly preceding detection pass.

This sensor device can afford the advantage that the elevator doors can be closed more quickly with the early closing signal. Consequently, waiting times can be shortened and the elevator can be operated more effectively.

By virtue of the fact that the early closing signal occurs only under specific conditions, however, namely when it is ensured that in a sufficient period previously no person has been directly in the region of the elevator door, i.e. in the door movement space together with the spatial region in front, it is possible to prevent persons from being startled by a surprising closing process. The operating convenience can accordingly be increased.

An elevator door is generally a sliding door. An elevator door can be a single-leaf or double-leaf sliding door. The sliding door can be solid or telescopic.

The door movement space is the space traversed by the front edge of the elevator door or elevator doors during the closing process.

Separate detection means that the detection of an object can be assigned to the door movement space or to the spatial region in front.

A memory in the sense of the present disclosure means any possibility for accessing information from the past, here generally just a temporary memory is sufficient to monitor a specific period previously. This can be implemented electronically in any form, e.g. by way of a main memory, RAM, a register, but also for example a flip-flop circuit or some other circuit that can store information temporarily.

Preferably, the evaluation device is configured, to output an opening signal for opening the elevator doors if an object is detected in the door movement space.

This can afford the advantage that the elevator doors are not opened unnecessarily again during the closing process. This can reduce wear.

Preferably, the evaluation device is configured to output a conditional closing signal for the conditional closing of the elevator doors if no object has been detected in the door movement space. Conditional closing means that the elevator doors are intended to be closed if simultaneously a specific time duration has elapsed since an opening signal for opening the doors.

This can afford the advantage that the elevator doors are not closed too early. This can reduce wear. The delay can also prevent the passenger from being unpleasantly startled by the doors immediately closing after entry.

Preferably, the evaluation device has a time switch and is configured to start the time switch upon detection of an object in the door movement space and to output a closing signal for closing the elevator doors if no object has been detected in the door movement space and simultaneously a specific time duration of the time switch has elapsed.

This can afford the advantage that the elevator doors are reliably closed.

Preferably, the conditional closing signal and the opening signal are the inverse of one another, and in particular one of the two signals is given by the absence of the other signal and in particular the conditional closing signal is defined by the absence of the opening signal, or vice versa, and in particular the opening signal is the high state and the conditional closing signal is the low state of the same signal line.

This can afford the advantage that only one signal line is required. This can reduce complexity and costs.

Preferably, the conditional closing signal and the early closing signal are different from one another and in particular are given neither identically and/or inversely with respect to one another and in particular are transmitted via different signal lines.

This can afford the advantage that safety is increased.

The control system according to the present disclosure is a control system for an elevator comprising a car comprising an elevator door, which has a door movement space in the passage and disposed in front of which is a spatial region in front on the floor in front of the door movement space. The control system has a detection device configured for detecting, in particular for separately detecting, objects in the door movement space and in the spatial region in front and for carrying out successive detection passes. The control system has a system controller configured to open the elevator doors if an object is detected in the door movement space, and to start a time switch upon the opening of the elevator doors and to close the elevator doors if no object has been detected in the door movement space and simultaneously a specific time duration of the time switch has elapsed. The system controller has a memory, and is configured to store at least temporarily the information as to whether an object has been detected during a detection pass, and to close the elevator doors if no object has been detected during a detection pass and simultaneously the information that an object has been detected has been stored in the memory for a preceding detection pass, in particular for the directly preceding detection pass.

The control system according to the present disclosure can contain the sensor device according to the present disclosure.

This can realize the above advantages.

Preferably, the door movement space substantially corresponds to the plane between the car doors and the shaft doors and corresponds in particular to the detection plane of a conventional light grid.

This can afford the advantage that a light grid can be obviated. This can reduce costs.

Preferably, the time duration of the time switch is five seconds.

This can afford the advantage that both the waiting time and the convenience as a result of startling being avoided are perceived as optimal by the passenger.

Preferably, the object is a person.

Preferably, the detection device is arranged on the transom of the passage, and/or is surrounded by a housing, in particular together with the evaluation device. Preferably, the detection device comprises a 3D sensor, in particular a TOF 3D sensor, and has in particular a sensor matrix, one region of the sensor matrix being assigned to detection in the door movement space and another region of the sensor matrix being assigned to detection in the spatial region in front.

This can afford the advantage that the mode of operation mentioned can be achieved cost-effectively and reliably.

Further features of the present disclosure are specified in the drawings.

The advantages mentioned in each case can also be realized for combinations of features in the context of which they are not mentioned.

FIG. 1 shows a control system 10 according to the present disclosure, comprising a sensor device 10 and a door controller 40 for an elevator.

The elevator has a car comprising one or two elevator doors. The elevator doors move in the passage in a door movement space. The door movement space is essentially the interspace of the open passage from the floor to the interior of the elevator car which is traversed by the door edges during closing. In front of the door movement space there is a spatial region in front on the floor. The spatial region in front is essentially a spatial region in front of the door movement space outside the car which is defined by the detection device and which extends for example to 2 meters in front of the door movement space. The sensor device 20 is arranged on the elevator car in the region of the transom. The transom is the upper horizontal region of the door passage. The door controller 40 is arranged in the shaft or machine room and is connected to the sensor device via a suspension cable from the elevator car.

The sensor device 20 transmits either an opening signal 31 or a conditional closing signal 32 to the door controller 40. The conditional closing signal 32 is given by the absence of the opening signal 31. In addition, the sensor device 20 can transmit an early closing signal 33 to the door controller 40.

The sensor device 20 has a detection device 21. The latter is a 3D TOF sensor and consists of a sensor matrix, an optical unit and an IR illumination facility. The detection device is designed such that it monitors two regions. The first region is the door movement space. The second region is the spatial region in front.

The sensor device 20 comprises an evaluation device having a first discriminator 22, a memory 23, a second discriminator 24 and a third discriminator 25.

If the elevator car has arrived at a stopping position and the doors have at least partly opened, then the sensor device 20, like a film camera, periodically effects detection passes in which it detects the two spaces and evaluates the detection in each case. In each detection pass, the detection device 21 captures an image of the door movement space and of the spatial region in front. The first discriminator 22 accepts the data from the detection device 21 via the data connection 21*a*, evaluates them and, if an object has been detected in the door interspace, then said first discriminator outputs an opening signal 31 and writes the detection of an object to the memory 23. If no object has been detected in the door interspace, the second discriminator 24 evaluates the data of the detection device 21 and, if an object has been detected in the spatial region in front, then said second discriminator outputs a conditional closing signal 32 and writes the detection of an object to the memory 23. The conditional closing signal 32 is the absence of the opening signal. The memory stores the fact of whether an object has been detected in the current detection pass until the next detection pass. If no object has been detected in the spatial region in front either, the third discriminator 25 evaluates the memory 23 and likewise transmits the conditional closing signal 32 if the memory does not contain the information that an object has been detected in the preceding detection pass, or transmits an early closing signal if the memory contains the information that an object has been detected in the preceding detection pass.

The door controller 40 receives either the opening signal 31, the conditional closing signal 32 or the early closing signal 33 from the sensor device 20.

If the door controller 40 receives the opening signal 31 via the connection 31*a*, then the door controller instigates the opening of the elevator door and starts a time switch 42.

If the door controller 40 receives the conditional closing signal 32 via the connection 32*a*, then a discriminator 43 evaluates whether a specific time duration has elapsed since the start of the time switch 42, and outputs a closing signal 44 and closes the elevator doors if the specific time duration has elapsed since the start of the time switch 42. The specific time duration is 5 seconds, but can also be longer or shorter. The connection 31*a* for the opening signal 31 and the connection 32*a* for the conditional closing signal 32 are the same signal line. The conditional closing signal is the absence of the opening signal on the same signal line.

If the door controller 40 receives the early closing signal 33 via the connection 33*a*, then the door controller 40 immediately closes the elevator doors. The early closing signal 33 is communicated via a different signal line than the opening signal 31 and the conditional closing signal 32.

Although the present invention has been described with reference to preferred embodiments, workers skilled in the art will recognize that changes may be made in form and detail without departing from the spirit and scope of the invention.

LIST OF REFERENCE SIGNS

10 Control system
20 Sensor device
21 Detection device
22 Evaluation of the door interspace
23 Memory
24 Evaluation of the spatial region in front
25 Evaluation of the memory
31 Opening signal
32 Conditional closing signal
33 Early closing signal
40 Door controller
41 Door opening process
42 Timer start
43 Timer evaluation
44 Closing signal
45 Door closing process

The invention claimed is:

1. A sensor device for an elevator, the elevator comprising a car, an elevator door, and a door movement space in a passage, wherein a spatial region is disposed on a floor in front of the door movement space, and wherein the sensor device comprises:
- a detection device configured to:
  - detect objects in the door movement space,
  - detect objects in the spatial region in front of the door movement space, and
  - carry out successive detection passes; and
- an evaluation device having a memory, wherein the evaluation device is configured to:
  - store, in the memory at least temporarily, information indicating that an object has been detected in the door movement space or the spatial region during a first detection pass, and
  - output an early closing signal for closing the elevator door based on no object being detected in the door movement space or the spatial region during a second detection pass, and the stored information indicating that the object was detected in the door movement space or the spatial region during the first detection pass.

2. The sensor device according to claim 1, wherein the evaluation device is configured to output an opening signal for opening the elevator door if an object is detected in the door movement space during the first detection pass.

3. The sensor device according to claim 1, wherein the evaluation device is configured to output a conditional closing signal for a conditional closing of the elevator door if no object is detected in the door movement space during the second detection pass and, simultaneously, a specific time duration has elapsed since an opening signal for opening the elevator door.

4. The sensor device according to claim 3, wherein the conditional closing signal and an opening signal are inverse of one another, and wherein:
- one of the two signals is output by the absence of the other signal,
- the conditional closing signal is defined by the absence of the opening signal, or vice versa, and
- the opening signal is a high state and the conditional closing signal is a low state of a same signal line.

5. The sensor device according to claim 3, wherein the conditional closing signal and the early closing signal are:
- different from one another,
- given neither identically and/or inversely with respect to one another, and
- transmitted via different signal lines.

6. The sensor device according to claim 1, wherein the evaluation device has a time switch and is configured to:
- start the time switch upon detection of an object in the door movement space, and
- output a closing signal for closing the elevator door if no object is detected in the door movement space during the second detection pass and, simultaneously, a specific time duration of the time switch has elapsed.

7. The sensor device according to claim 6, wherein the specific time duration of the time switch is 5 seconds.

8. The sensor device according to claim 1, wherein the first detection pass is a directly preceding detection pass relative to the second detection pass.

9. The sensor device according to claim 1 wherein the object is a person.

10. A control system for an elevator comprising a car, an elevator door, and a door movement space in a passage, wherein a spatial region is disposed on a floor in front of the door movement space, and wherein the control system comprises:
- a detection device, configured to:
  - detect objects in the door movement space, detect objects in the spatial region in front of the door movement space, and
  - carry out successive detection passes; and
- a system controller, configured to:
  - open the elevator door if an object is detected in the door movement space,
  - start a time switch upon the opening of the elevator door, and
  - close the elevator door if no object has been detected in the door movement space and, simultaneously, a specific time duration of the time switch has elapsed,
- wherein the system controller has a memory, and is configured to:
  - store, in the memory at least temporarily, information indicating that an object has been detected in the door movement space or the spatial region during a first detection pass, and
  - close the elevator door based on no object being detected in the door movement space or the spatial region during a second detection pass, and the stored information indicating that the object was detected in the door movement space or the spatial region during the first detection pass.

11. The control system according to claim 10, wherein the specific time duration of the time switch is 5 seconds.

12. The control system according to claim 10, wherein the object is a person.

13. The control system according to claim 10, wherein the detection device:
- is arranged on a transom of a passage, and/or
- is surrounded by a housing, together with the system controller being encompassed by the housing, and/or
- comprises a TOF 3D sensor, and/or
- has a sensor matrix, wherein one region of the sensor matrix is assigned to detection in the door movement space, and wherein another region of the sensor matrix is assigned to detection in the spatial region.

14. The control system according to claim 10, wherein the first detection pass is a directly preceding detection pass relative to the second detection pass.

15. A method of controlling an elevator door, the method comprising:

detecting, during a first detection pass, an object in a door movement space or a spatial region in front of the door movement space;

storing, in a memory, information indicating that the object was detected in the door movement space or the spatial region during the first detection pass;

detecting, during a second detection pass, an absence of an object in the door movement space or the spatial region in front of the door movement space; and outputting an early closing signal for closing the elevator door based on the detection of the absence of the object during the second detection pass and based on the stored information indicating that the object was detected in the door movement space or the spatial region during the first detection pass.

16. The method according to claim 15, and further comprising:

outputting an opening signal for opening the elevator door if the object is detected in the door movement space.

17. The method according to claim 15, and further comprising:

outputting a conditional closing signal for a conditional closing of the elevator door if no object is detected in the door movement space during the second detection pass and, simultaneously, a specific time duration has elapsed since an opening signal for opening the elevator door.

18. The method according to claim 15, wherein detecting, during the first detection pass, the object in the door movement space or the spatial region in front of the door movement space comprises:

capturing an image of the door movement space or the spatial region.

* * * * *